United States Patent [19]

Hilker

[11] Patent Number: 5,131,894
[45] Date of Patent: Jul. 21, 1992

[54] AXLE SHAFT RETAINER OF USE IN DIFFERENTIAL CASE

[75] Inventor: Gregory J. Hilker, Fort Wayne, Ind.

[73] Assignee: Dana Corporation, Toledo, Ohio

[21] Appl. No.: 661,769

[22] Filed: Feb. 27, 1991

[51] Int. Cl.$^5$ .............................................. F16H 1/40
[52] U.S. Cl. .................................. 475/230; 403/155; 403/326
[58] Field of Search ................ 475/230; 403/282, 263, 403/155, 326, 261

[56] References Cited

U.S. PATENT DOCUMENTS

| | | | |
|---|---|---|---|
| 1,115,536 | 11/1914 | Hinkley | 475/230 |
| 3,419,292 | 12/1968 | Peltret et al. | 403/261 |
| 3,527,120 | 9/1970 | Duer et al. | 475/235 |
| 3,606,406 | 9/1971 | Walters | 403/240 |
| 3,624,717 | 11/1971 | Brubaker | 475/235 |
| 3,774,250 | 4/1975 | Duer | 5/471 |
| 3,853,022 | 12/1974 | Duer | 475/230 |
| 4,118,134 | 10/1978 | Manuel | 403/282 |
| 4,365,524 | 12/1982 | Dissett et al. | 475/226 |
| 4,630,506 | 12/1986 | Allmandinger et al. | 475/230 |

Primary Examiner—Richard Lorence
Assistant Examiner—William O. Trousdell
Attorney, Agent, or Firm—Dykema Gossett

[57] ABSTRACT

A shaft retention system is disclosed that is particularly useful for attaching an axle to a side gear in a differential case. The shaft preferably has an inner end with opposed flat surfaces that extend to a groove in the shaft. A spring washer and clip having mating flats are mounted on the inner end, with the flats on the spring washer and clip aligned with the flats on the shaft end. The clip is then rotated relative to the spring washer, and tabs on the spring washer snap into a notch in the clip preventing further rotation between the two. In this position, the flats on the clip no longer align with the flats on the inner end of the shaft preventing removal of the spring washer and clip from the shaft. The clip is preferably C-shaped, with the notch formed by the open end of the C.

13 Claims, 1 Drawing Sheet

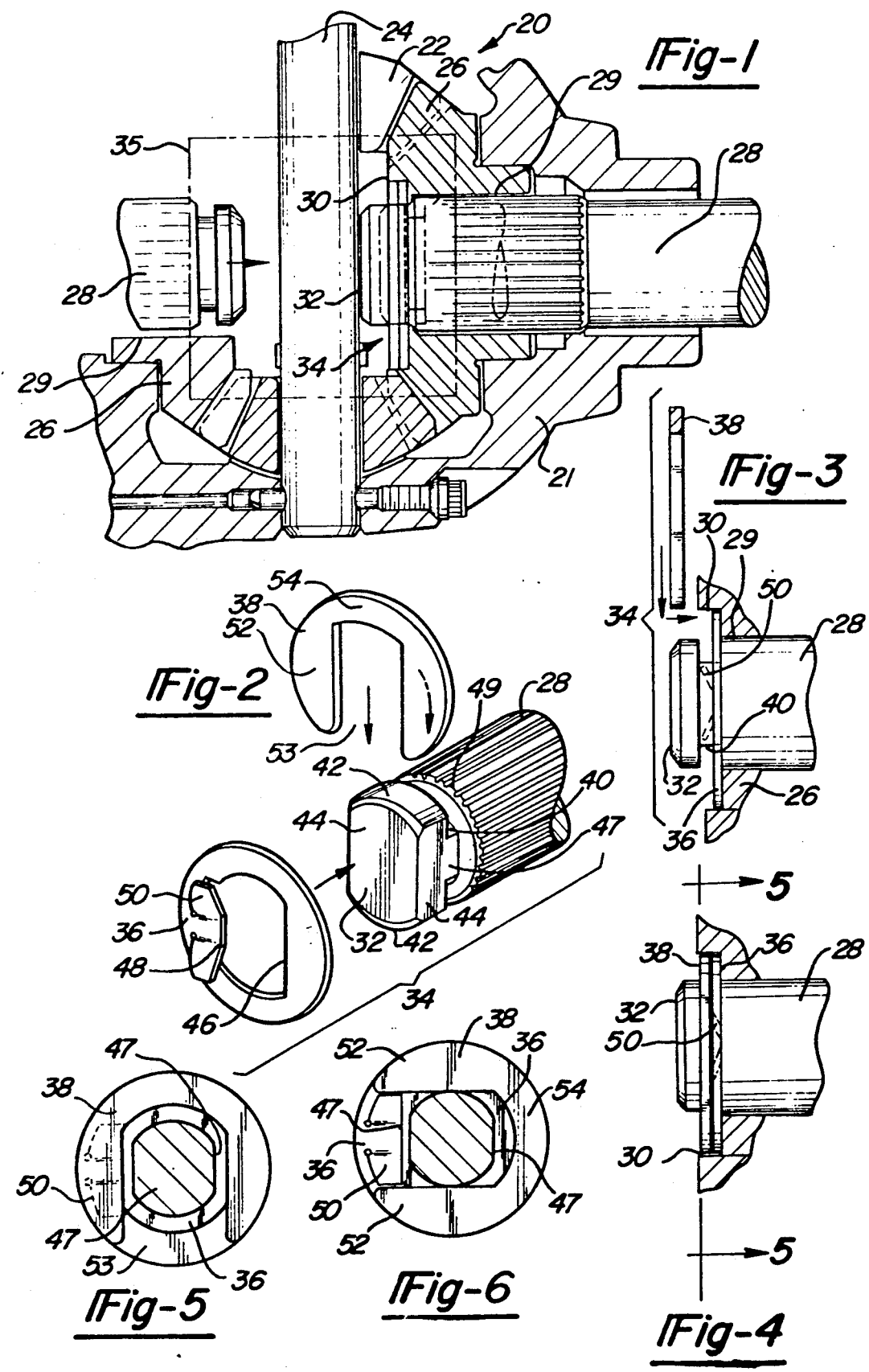

AXLE SHAFT RETAINER OF USE IN DIFFERENTIAL CASE

BACKGROUND OF THE INVENTION

The present invention relates generally to shaft retention systems. More particularly, the present invention discloses a novel axle shaft retention system for maintaining a shaft fixed to a gear in a differential assembly.

Differentials are typically utilized in transmitting rotation from a first drive shaft to a pair of driven shafts. The assembly of the shafts and associated gears into a differential case is sometimes quite complex, and there is a desire to releasably attach the driven shafts to the gears, such that the shafts can be removed without disassembling the differential. Several prior art methods and systems are known.

In one system disclosed in U.S. Pat. No. 1,115,536, C-shaped clips are placed within a groove in the shaft to maintain the shaft fixed relative to a driven gear. Although relatively simple, this system may not securely maintain the shaft within the side gear.

A more complex securing system is disclosed in U.S. Pat. No. 4,630,506. Although this system does perform quite well, it is still desirable to achieve a less complex system.

It is therefore an object of the present invention to disclose a axle shaft retention system for connecting a shaft to a gear within an assembled differential that is relatively simple, and easy to utilize.

SUMMARY OF THE INVENTION

In a disclosed embodiment of the present invention, an inner end of a shaft extends through a bore in a driven side gear within a differential case. The interior of the differential case is accessible through a window in the case. In assembling the shaft to the gear, the shaft is first inserted through the gear bore, and through a spring washer placed adjacent to the inner end of the bore. A clip is then placed on the shaft end between the inner end of the shaft and the spring washer. The clip and washer abut an inner face of the driven gear, fixing the shaft axially relative to the gear. In a disclosed embodiment of the present invention, there are means to prevent rotation of the clip relative to the spring washer.

In a preferred embodiment of the present invention, the rotation prevention means include a tab extending off of the spring washer and into a notch in the clip. In a most preferred embodiment of the present invention, the member is a pair of projecting tabs extending off the spring washer over a small angular extend, and the clip member is generally C-shaped, with the notch being formed by the open end of the C-shape.

Preferably, the spring washer and the clip are received in a groove spaced between the inner end of the shaft and an inner face of the gear that the spring washer abuts. The inner end of the shaft preferably abuts a portion of the differential, and in a preferred embodiment the pinion cross shaft, preventing further inward movement of the shaft. The spring washer abuts a counter bore formed on an inward face of the gear, preventing outward movement of the shaft. These two abutments axially fix the shaft relative to the gear. In a preferred embodiment, the clip and washer are dimensioned to be slightly larger than the extent of the groove, such that the spring washer is slightly compressed by the clip in the groove.

Preferably, the inner end of the shaft has opposed arc portions of a first diameter and opposed flat portions connecting the two arc portions. The flats are spaced from each other by a distance that is equal to, or less than, the diameter of the groove. The spring washer also has opposed arc portions at an inner periphery that are connected by flat portions. As such, the spring washer has an inner periphery configured similarly to the inner end of the shaft. When the spring washer is initially placed on the shaft, the spring washer is in a position such that the flat portions on its inner periphery align with the flats on the shaft inner end, such that the spring washer can move onto the inner end and into the groove in the shaft. The groove preferably includes flats extending from the flats on the shaft inner end such that the spring washer is constrained from rotating in the groove.

The C-shaped clip has flats such that it can be initially placed onto the flat portions of the inner end through the window in the differential case. The clip can then be moved into the groove. In this initial mounted position, the tab on the spring washer is not aligned with the open end on the clip. As mentioned above, the thickness of the clip and spring washer together are slightly greater than the extent of the groove. Since a flat end of the clip is aligned with the tab, the clip compresses the tab and the spring washer further into the groove, and against the inner face of the gear. Once the clip and spring washer are received in the groove, one is rotated relative to the other until the projections on the spring washer snap into the open end of the clip, thus preventing further relative rotation. Preferably the clip is rotated through approximately 90°. Since the clip has now rotated from its initial mounting position, it no longer has flat portions aligned with the flats on the shaft inner end. Thus, the clip cannot be removed from the shaft inner end.

Further, the clip and spring washer are received in a counter bore in the gear inner face, which is preferably of a diameter only slightly greater than the outer diameter of the clip and the spring washer. Due to this close clearance the clip cannot move radially off of the shaft, which could allow the spring washer and clip to move off of the shaft inner end.

In a method according to the present invention, the shaft is initially inserted through the bore and the spring washer, such that the spring washer moves onto the inner end of the shaft. The spring washer may be placed in the counter bore prior to insertion of the shaft. The clip member is then inserted onto the inner end of the shaft and forces the spring washer into the counter bore. The clip is then rotated relative to the spring washer until the tab snaps into the clip notch, locking the two against further relative rotation. Preferably, the shaft abuts a pinion cross shaft defining a proper axial position for the shaft inner end relative to the driven gear, and also preventing further inward movement. The spring washer prevents outward movement of the shaft.

These and other objects and features of the present invention can be best understood from the following specification and drawings of which the following is a brief description.

BRIEF DESCRIPTION OF THE DRAWINGS

FIG. 1 is a cross-sectional view through a differential case embodying the axial shaft retention system of the present invention.

FIG. 2 is an exploded assembly view for the axial shaft retention system.

FIG. 3 is a partially assembled view of the system illustrated in FIG. 2.

FIG. 4 is an assembly view subsequent to that shown in FIG. 3.

FIG. 5 is a view along lines 5—5 as shown in FIG. 4.

FIG. 6 shows the final assembled system.

DETAILED DESCRIPTION OF A DETAILED EMBODIMENT

An assembled differential 20 is illustrated in FIG. 1 and includes case 21 mounted to bevel drive gear 22 through pinion cross shaft 24. A pair of opposed side gears 26 mesh with drive gear 22, and have shafts 28 extending through bores 29. Counter bore 30 is formed on an inner face of side gear 26. Inner end 32 of shaft 28 abuts cross shaft 24. A shaft retention system 34 fixes shaft 28 relative to side gear 26. Window 35 is shown schematically, and includes a portion of case 21 that provides access to inner end 32 of shaft 28 for removal of shaft retention system 34 and shaft 28.

FIG. 2 shows the unassembled shaft retention system 34. Spring washer 36 is first placed onto inner end 32 and moved axially towards side gear 26. Clip 38 is also placed on inner end 32, spaced towards inner end 32 from spring washer 36. Clip 38 and spring washer 36 are preferably received in groove 40 on shaft 28.

Inner end 32 has a pair of opposed arc portions 42 connected by flat portions 44. Spring washer 36 has mating flats 46 and 48 which are aligned with flats 44 such that spring washer 36 can be moved onto inner end 32, and into groove 40. Groove 40 has flats 47 extending from flats 44. Cylindrical portion 49 of shaft 28 is of a diameter greater than the distance between flats 46 and 48 on spring washer 36, such that spring washer cannot move axially beyond groove 40.

Spring washer 36 has a pair of tabs 50 extending in circumferentially opposed directions away from a nominal face of the washer, and towards inner end 32. Clip 38 includes flat portions 52, open end 53, and arc portion 54, and could be said to be generally C-shaped. Clip 38 is placed on inner end 32 with flats 52 aligned with flats 44. When spring washer 36 and clip 38 are in rotated positions such that their flats align with flats 44 on inner end 32, tabs 50 on spring washer 36 do not align with open end 53.

FIG. 3 shows the assembly of the shaft retention system 34 to fix shaft 28 to side gear 26. Spring washer 36 is initially placed adjacent to counter bore 30, and shaft 28 is moved through bore 29 and spring washer 36, such that spring washer 36 moves into groove 40. Spring washer 36 would have flats 46 and 48 aligned with flats 44 and 47 at that time. Clip 38 is moved into case 21, and onto inner end 32, with flats 52 aligned with flats 44 and 47. When washer 36 and clip 38 are in this initial mounting positions, a flat 52 on clip 38 is aligned with tabs 50 on spring washer 36. Clip 38 is then moved toward side gear 26 and into counter bore 30 against spring washer 36. The flat 52 compresses tabs 50, and clip 38 eventually moves into groove 40.

FIG. 4 shows clip 38 having compressed spring washer 36 such that they are both received within the axial extent of groove 40, and surrounded by counter bore 30. At this time, tabs 50 are aligned with one flat side 52 of clip 38.

FIG. 5 is a cross-section through FIG. 4 and illustrates tabs 50 aligned with flat 52 of clip 38. Both clip 38 and spring washer 36 are received within groove 40. At this time, clip 38 and spring washer 36 may move axially back off of inner end 32 since the flats of the two members are still aligned with flats 44 on inner end 32.

FIG. 6 illustrates the final position of the assembled shaft retention system 34. Clip 38 has now been rotated approximately 90° relative to spring washer 36. The inner profile of clip 38 is sufficiently large that it can rotate without interference from the groove 40 cross-section. Open end 53 is now aligned with tabs 50, which spring outwardly and into open end 53, locking clip 38 relative to spring washer 36 and preventing further rotation between the two. Flat ends 52 on clip 38 no longer align with flat ends 44 on inner end 32. The assembled clip 38 and spring washer 36 thus cannot move off of inner end 32 of shaft 28. Since clip 38 is closely received in counter bore 30 it cannot move radially off shaft 28. Preferably clip 38 and spring washer 36 have approximately equal outer diameters.

Inner end 32 abuts cross shaft 24 preventing further inward movement of shaft 28. Spring washer 36 abuts a face of side gear 26 in counter bore 30, preventing outward movement of shaft 28. Thus, shaft 28 is fixed axially relative to gear 26.

When one wishes to remove shaft 28 from differential casing 21, one need merely compress tabs 50 and rotates clip 38 relative to spring washer 36. Once the flats on clip 38 and spring washer 36 are both aligned with flat ends 44, the members can be easily removed from groove 40. Shaft 28 can then be removed from within bore 29.

In mounting shaft 28 to side gear 26, spring washer 36 is initially placed adjacent to bore 29, and preferably in counter bore 30. Shaft 28 is then moved through bore 29 and spring washer 36. Clip 38 is moved onto inner end 32 of shaft 28 and forced against spring washer 36, compressing tabs 50. Clip 38 is rotated relative to spring washer 36, such that tabs 50 snap into open end 53 preventing further rotation.

Clip 38 may be rotated by use of a spanner wrench. Alternatively, the member connected to shaft 28, which may be vehicle wheel, may be rotated to rotate spring washer 36 relative to clip 38.

In this way, it is relatively simple to assemble a shaft to a side gear in a differential casing. No disassembly of the differential is required. Further, the system is relatively simple and inexpensive.

The spring washer may be formed from S.A.E. 1070 to 1080 steel, having a hardness of R.C. 44 to 52. Preferably, the tabs are stamped out of the face of the spring washer and bent up approximately 0.080 inches at their outer end. The clip may be formed of S.A.E. 1050 steel, and have a hardness of Rockwell C 30 to 35.

A preferred embodiment of the present invention has been disclosed, however, a worker of ordinary skill in the art would recognize that certain modifications would come within the scope of this invention. For this reason, the following claims should be studied in order to determine the true scope and content of this invention.

I claim:

1. A differential comprising:
   a bevel drive gear mounted within a casing;

a pair of opposed side gears meshing with said drive gear and mounted within said casing;

a pair of shafts extending along an axis, each connected to rotate with one of said side gears, at least one of said shafts having a first shaft end extending through a respective side gear, in a direction toward the other said side gear, a spring washer and a clip mounted to said at least one shaft inwardly of said one side gear for maintaining said shaft axially fixed relative to said one side gear, said clip being spaced towards said first end from said spring washer; and anti-rotation means to prevent said clip from rotating relative to said spring washer, said anti-rotation means including said spring washer having a tab member extending towards said clip from a face of said washer over a portion of its circumferential extent, said clip being generally C-shaped with an open end receiving said at least one shaft and extending to an outer periphery of said clip, said open end forming a notch, and said tab being received in said notch.

2. A differential as recited in claim 1, wherein said at least one shaft is configured such that said spring washer and said clip may be moved onto said first end of said shaft when in a particular rotated position, and wherein one of said clip and said spring washer being rotated away from said particular position when mounted to said at least one shaft, such that said spring washer and clip cannot move off of said first end.

3. A differential as recited in claim 2, wherein said first end of said shaft has a pair of opposed flats at an outer periphery, and said spring washer has an inner periphery having two arcs over portions of its circumference and a pair of flats connecting said two arcs, such that said spring washer can move onto said first shaft end, said clip also having at least one arc portion and a pair of flats such that said clip can move onto said first shaft end, said particular rotated position being defined when flats on said first shaft end, said spring washer, and said clip are aligned, and upon rotation of one of said clip and said spring washer away from said particular position, one of said clip and said spring washer no longer having flats aligned with said flats on said first shaft end such that said spring washer and said clip cannot move off of said first shaft end.

4. A differential as recited in claim 3, wherein a groove is formed in said shaft at a position adjacent to said first end, but spaced away from said first end relative to said flats such that said clip and said spring washer can move onto said first end and into said groove, with the rotation of one of said clip and said spring washers being within said groove.

5. A differential as recited in claim 2, wherein said one side gear has a counter bore receiving said spring washer and said clip, said counter bore having an inner periphery slightly greater than the outer periphery of said clip such that said clip may not move radially relative to said at least one shaft.

6. A differential as recited in claim 1, wherein both of said shafts having said clip and spring washer.

7. A differential as recited in claim 3, wherein said tab extending from one of said pair of flats on said spring washer, and said open end of said clip being formed at a location opposed to said at least one arc portion of said clip.

8. A differential as recited in claim 7, wherein said tab consists of a pair of circumferentially-spaced resilient tab portions each extending in circumferentially opposed directions from an inner end at said face of said spring washer to outer ends spaced toward said clip from said face of said spring washer.

9. A differential as recited in claim 1, wherein said tab consists of a pair of circumferentially-spaced tab portions each extending in circumferentially opposed directions from an inner end at said face of said spring washer to outer ends spaced toward said clip from said face of said spring washer.

10. A shaft connection comprising:

a shaft connected to rotate with a member, said shaft having a first shaft end extending through an aperture in said member, a spring washer and a clip mounted to said shaft between said first end and said member for maintaining said shaft axially fixed relative to said member, said clip being spaced towards said first end from said spring washer; and anti-rotation means to prevent said clip from rotating relative to said spring washer, said anti-rotation means including said spring washer having a tab extending toward said clip form a face of said spring washer over a portion of its angular extent, said clip being generally C-shaped with an open end receiving said shaft and extending to an outer periphery of said clip, said open end forming a notch, and said tab being received in said notch.

11. A shaft connection as recited in claim 10, wherein said tab consists of a pair of circumferentially-spaced resilient tab portions each extending in circumferentially opposed directions from said face of said spring washer to outer ends spaced toward said clip from said face of said spring washer.

12. A shaft connection as recited in claim 10, wherein said first shaft end having a pair of opposed flats at an outer periphery, and said spring washer having an inner periphery with two arcs portions and a pair of flats connecting said two arc portions such that said spring washer can move onto said first shaft end, said clip also having at least one arc portion and a pair of flats defining said C-shape such that said clip can move onto said first shaft end, and said tabs extending from one of said flats on said spring washer.

13. A shaft connection as recited in claim 12, wherein said tab consists of a pair of circumferentially-spaced resilient tab portions each extending in circumferentially opposed directions from said face of said spring washer to outer ends spaced toward said clip from said face of said spring washer.

* * * * *